April 1, 1969     J. H. FORTENBACH ET AL     3,435,517

METHOD OF MAKING A TIELESS BRACING OF STATOR COIL END TURNS

Original Filed Sept. 23, 1963

INVENTORS
JOHN H. FORTENBACH
HUGH B. HOLLOWOOD
HENRY E. MAZANEK

BY *james R Campbell*

THEIR ATTORNEY

INVENTORS
JOHN H. FORTENBACH
HUGH B. HOLLOWOOD
HENRY E. MAZANEK
BY
*James R Campbell*
THEIR ATTORNEY

United States Patent Office 3,435,517
Patented Apr. 1, 1969

3,435,517
METHOD OF MAKING A TIELESS BRACING OF STATOR COIL END TURNS
John H. Fortenbach, Sun City, Ariz., and Hugh B. Hollowood, Ballston Spa, and Henry E. Mazanek, Amsterdam, N.Y., assignors to General Electric Company, a corporation of New York
Original application Sept. 23, 1963, Ser. No. 310,600, now Patent No. 3,320,452, dated May 16, 1967. Divided and this application Dec. 9, 1966, Ser. No. 619,092
Int. Cl. H02k 15/00
U.S. Cl. 29—596                 4 Claims This application is a division of copending application Ser. No. 310,600, filed Sept. 23, 1963, now Patent No. 3,320,452.

The invention described herein relates to dynamoelectric machines and particularly to an improved arrangement for supporting the winding coil end turns of a stator against circumferential and radial displacement.

Most dynamoelectric machines, particularly motors having ratings of about 150 HP and greater, utilize form wound coils for the winding wherein each coil comprises a plurality of layers of copper conductor wound into a closed loop including leads. Insulation having the desired dielectric characteristics is then wrapped on the coil outer surface prior to installing it in a rotor or stator. When the motor is placed in operation, the coils are subjected to large currents both during starting and when peak loads suddenly are applied to the motor rotor. These large currents develop extremely strong magnetic fields of varying intensity which link adjacent coil end turns in the stator and cause them to move during the starting or peak load cycles. To overcome such end turn displacement most manufacturers install an insulated steel ring around the concentrically disposed end turns and each end turn then is firmly secured to the ring with strong tying cords of nylon, glass or other fibrous materials. To supplement this bracing structure, wedges of an insulation material, such as that identified by the trademark Textolite, are fitted between the sides of adjacent end turns and firmly tied thereto, usually by the same tying cords used for securing the end turns to the ring. This construction and similar modifications have proven reasonably effective in preventing end turn displacement to reasonable degrees.

However, progress made in recent years in the development of new coil insulation and other materials and in motor designs generally, have permitted manufacturers to increase the power rating for both motors and generators while still employing the same size frames and rotor and stator magnetic cores previously used in machines of lesser rating. In doing so, the increased current values in the winding have accentuated the stator coil end turn displacement problem to the extent that end turn movement can be restrained only by the use of elaborate and expensive bracing structures. Examples of the faults which occasionally develop because of inadequate support for the end turns are that insulation on the coil conductors becomes worn at the point where the coil makes its exit from the stator slot, thus decreasing the dielectric strength necessary for protecting the current carrying coil from the iron in the stator. Such coil end turn movement also causes chafing and wearing of the insulation between the steel support ring and the outer surface of the coil end turns. The series and connection leads normally disposed concentrically on the end turns at one end of the machine become worn by the continued moving action of the coils as they are displaced during starting and peak load cycles. Such coil end turn movement, when coupled with the mechanical vibrations normally generated in the machine and aging of the insulation materials, creates looseness in the ties and wedges which allows the ends to move through even greater distances and contributes substantially to the insulation deterioration problem.

A further important problem resulting from the use of these prior art constructions is the resonant frequency of the coil and the bracing structure falls within the same range as twice the exciting frequency of the flux produced by the current flowing in the winding. When the resonant and exciting frequencies correspond, movement of the coil end turns reach maximum amplitudes and unless the coils are rigidly fixed in position, coil destruction soon results. Investigations carried out show that the resonant frequency and therefore the maximum vibration amplitude at rated frequency varies with temperature and the insulation materials used, thus making clear the bracing system must be designed to have a resonant frequency falling outside the range of current frequencies expected to be applied to a particular machine.

Tests conducted on a multitude of different types and ratings of stators show that coil end turn amplitude of vibration can be as large as one-half inch, when supported by conventional constructions. It is known that such movement does not occur in all coils simultaneously, but rather, follows a pattern similar to that of the flux as it rotates around the stator during the time the winding is energized.

Realizing the complexity of the coil end turn displacement problems inherent in form wound machines and in their analysis, and further realizing the inadequacy of present constructions to effectively eliminate or at least substantially minimize such movement, an extensive evaluation and testing program was undertaken having as its primary objective, the development of a bracing system for stator coil end turns capable of restricting end turn movement to amounts of insignificant value.

Another object of our invention is to provide support rings of material having good dielectric characteristics positioned concentrically around the end turns and having the most desirable characteristics for end turn bracing use.

Still another object of our invention is to eliminate the use of tying cords and wedges heretofore used in securing the coil end turns to a support ring.

Still another object of our invention is to provide a coil end turn bracing system of both higher quality and lower cost than present support systems.

Another object of our invention is the provision of improved methods for applying rings to the inner and outer peripheral surfaces of end turns and between the overlying inner and outer end turn layers.

In carrying out our invention we locate an initially soft ring of flexible material between the inner and outer layers of end turns during the course of installing coils comprising the winding in the stator. Depending on the degree of bracing required, a ring of similar material is applied concentrically to both the outer and inner end turn peripheral surfaces for restricting their movement in a radial direction. Since all three rings are of an initially flexible material, portions of the material become wedged between the sides of adjacent coils and upon being cured, provides an impediment to the movement of the end turns in circumferential and radial directions. It will be apparent to those skilled in the art that either or all of the rings may be used with a particular motor or generator depending on the motor rating and the performance requirements which must be exhibited by the machines to obtain the desired standards of operation.

The subject matter which we regard as our invention is particularly pointed out and distinctly claimed in the concluding portion of this specification. Our invention, however, both as to organization and method of operation, together with further objects and advantages thereof, may best be understood by reference to the following description taken in connecton with the accompanying drawing in which:

Figure 1:
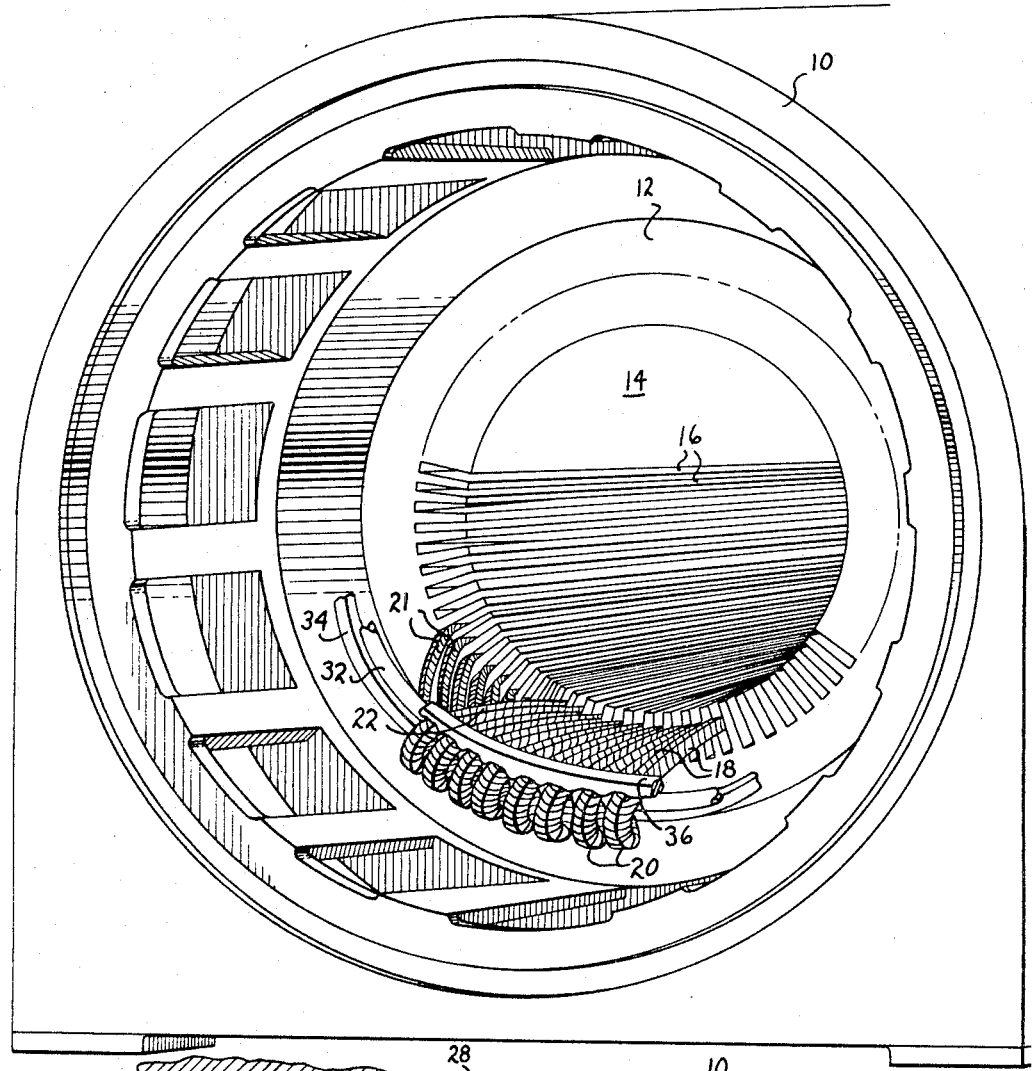
FIGURE 1 is a perspective view of an end of a motor stator illustrating the arrangement of the inner and outer support rings and the ring positioned between the inner and outer layers of the coils.

Referring now to the drawings wherein like reference characters designate like or corresponding parts throughout the several views there is shown in FIGURE 1, a motor comprising a frame 10 enclosing a stator 12 made of stacked laminations 14 having slots 16 extending axially therethrough. The winding for the stator consists of a multitude of form wound coils 18 having end turns 20 projecting beyond opposite ends of the laminated magnetic core. It will be noted the coils are of a conventional type having a multiplicity of conductor wires assembled together in a closed loop with leads, and wrapped with an appropriate ground insulation such as that identified by assignee's trademarks Polyex and Polyseal.

As is well known in the art, the coils are inserted in the machine first by positioning one arm or slot portion 21 of each coil in the bottom of a slot 16 and the other slot portion 22 of the same coil into the inner part or top of a slot 16 several slots removed. When the stator is wound, the end turns for those coils in the bottom of slots constitute the outer layer of end turns 23, while those in the top of the slots constitute the inner layer of end turns 24. As in usual constructions, the stator is equipped with a finger flange 26 and a ring 28 held in place by a key 30 for holding the laminated stack under compression. The stator thus far described is of conventional design and includes components well known in the art. The design of stator core identified as a prewound core having axially disposed metal straps on the core peripheral surface and which is disclosed in the copending application of Clothier et al., Ser. No. 826,358, filed July 10, 1959, issued as Patent No. 3,156,840, can also be used with this invention.

Although the invention described herein is disclosed in relation to a form wound stator, it is to be understood the teachings are equally applicable to any electrical device wherein the coils must be restrained against movement. Obvious examples are wound rotors using form wound coils and to random wound motors of the usual type wherein the coils consist of a multiutde of small diameter conductors not equipped with the heavy ground insulation needed in the form wound machines. Transformers and the stators for electromagnetic pumps are other obvious examples.

The improvement of this invention consists in utilizing a single or multiplicity of support rings positioned on the end turns for preventing their radial and circumferential displacement when the machine is placed in operation.

Figure 2:
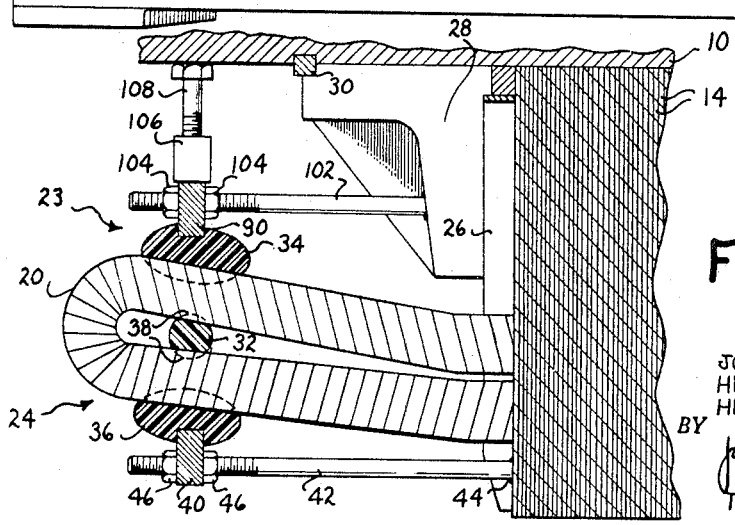
FIGURE 2 is an enlarged view of a portion of the stator illustrating the disposition of the support rings relative to the stator coil end turns.

As illustrated in FIGURES 1 and 2 it will be seen the bracing system generally comprises a ring 32 positioned between the overlying inner and outer layers of coil end turns, a ring 34 located on the outer surface of the outer layer of end turns, and a ring 36 on the inner surface of the inner layer of end turns. These rings of thermosetting resinous material are initially soft and pliable when applied to the end turns and portions thereof are squeezed or otherwise forced into the space between adjacent end turn sides during the manufacturing process. When the resinous material is cured to a hard rigid state, those portions of the rings squeezed into the inter-end turn space restrict end turn movement in a circumferential direction while the strength in the ring thickness prevents end turn displacement radially.

Referring more specifically to the methods used for applying the rings to the end turns, FIGURE 1 illustrates the disposition of coils as they appear in a completely wound stator. As the coil winding process proceeds and the coils are placed in the bottom of the slots, the molding ring 32 is laid on the exposed surface of end turns facing the air gap before the other slot portion of the coils are fitted in the top of the slots. This constitutes the total effort required in placing the ring 32 between the end turn inner and outer layers.

Figure 3:
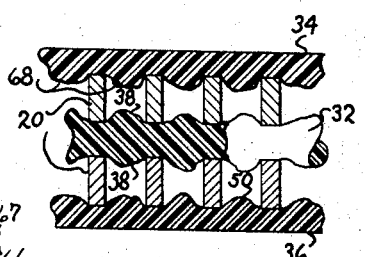
FIGURE 3 is a sectional end view of FIGURE 2 specifically showing how the support rings fill the space between adjacent coil end turns for preventing their movement in both a radial and circumferential direction.

The diameter or thickness of the ring is chosen to be about 50 percent greater than the maximum radial distance between the inner and outer layers. Because the radial distance between the overlapping inner and outer end turn layers is less than the ring thickness and since the resinous material of ring 32 displays initially soft and highly flexible characteristics, it easily conforms to the end turn surfaces when the slot portions 22 are forced into the top of the slots. The end turn portion compresses the resinous ring and that portion thereof not in contact with the facing inner and outer layer surfaces, is squeezed between the sides of adjacent end turns. FIGURES 2 and 3 illustrate the final position of the ring material between adjacent coils and shows projection 38 appearing in the inter-end turn space and how they conform to the sides of end turns 20.

When the ring subsequently is subjected to the influence of heat in a temperature range where the ring materials cure, conversion from a soft to a hard rigid mass takes place without either expanding or contracting to any appreciable degree.

The rigidity in the ring prevents the inner and outer layers of end turns from being displaced circumferentially because of the impediment provided by the squeezed-in portion 38. It has been found from carrying out a multitude of tests on different size stators, that the ring conforms completely to the end turn surfaces and embraces them in such fashion as to obtain a relatively firm grasp therewith. Radial end turn movement toward each other is prevented by the relative incompressibility of the ring material and its resistance to deformation after curing. Depending on the type, rating and performance characteristics for a particular machine, a single ring between the inner and outer end turn layers often is sufficient for restricting end turn displacement when subjected to the mechanical and electrical vibratory forces normally encountered during machine operation. Usually slow speed types of motors, i.e., up to about 900 r.p.m. are equipped with end turns of relatively short axial length and the stiffness normally inherent in the coil conductors is sufficient to restrict their movement in a radial direction. The ring 32 between the inner and outer layers then prevents their displacement in a circumferential direction. Although the ring 32 is shown as being positioned relatively close to the nose or end of the coil end turns, it will be apparent it can be located at any position along the end turn length depending on the length of the end turns, their stiffness, the difficulty in inserting the soft ring between the inner and outer layers and the degree of force expected to be encountered during operation of the machine.

Turning now to the methods employed for obtaining application of the inner ring 36 to the exposed surfaces of the inner layers of end turns, a number of different processes were developed and tested to determine the simplest procedures to follow from the standpoint of time and complexity while still providing a completely acceptable bracing system. Two different systems evolved, axial jacking and radial ring compression methods.

After all of the coils comprising the winding are wound in the stator, the initially soft ring 36 is mounted on an endless hoop 40 of non-magnetic material, such as stainless steel, aluminum or polyester glass compositions. The hoop 40 preferably is affixed to the ring 36 by a gluing agent or a cloth covering which tends to minimize distortion in the molding ring 36 as it is moved axially into position on the end turns. The hoop 40 with its attached molding ring 36 is then placed in the opening formed by the concentrically disposed end turns.

The hoop is equipped with axial holes for receiving bars 42 which bear at one end 44 against an end of the stator and terminates at its other end in screw threads. When the jacking nuts 46 on the bar are taken up uniformly around the hoop periphery, the hoop 40 with its supported molding ring is jacked axially, slowly and positively toward the stator and into contact with the end turns around the stator periphery.

The end turns usually are at an angle with the stator axis and as the jacking process proceeds, the molding ring commences to roll over on the hoop and deform out of its original circular or square shape because of the friction encountered with the end turn surfaces. However, since the molding ring is soft and highly flexible, it conforms reasonably well with the angled end turns while portions of the ring surface simultaneousy becomes squeezed between the sides of adjacent end turns. When jacking reaches the point where maximum coil restraint is obtained and it appears sufficient material is squeezed between the void spaces formed by adjacent end turns, with the steel hoop 40 out of direct contact with the end turns, jacking is stopped. FIGURE 3 illustrates the configuration of the squeezed in projections 50 and how they conform to the exposed surfaces of the inner layers of end turns.

After the molding ring 36 is cured, the projections 50 serve to restrict end turn movement in a circumferential direction while the ring thickness restrains the end turns from movement inwardly. As previously described, ring 34 prohibits movement radially outward. It therefore is apparent, the coacting action of projections 38 and 50 and the mass of rings 32, 34 and 36 effectively locks each end turn in a preset position. Since a complete locking action is accomplished, there is no need to employ the tying cords and tie blocks now required on present stators to hold the end turns in place.

Figure 7:
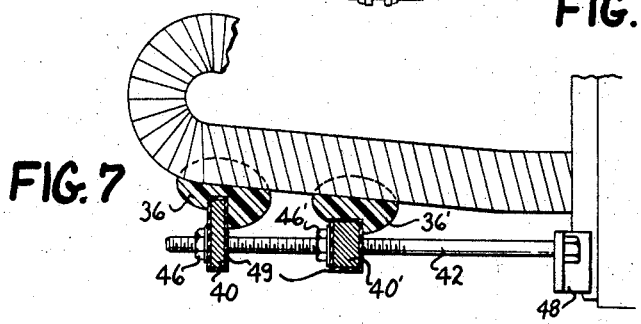
FIGURE 7 illustrates an axial jacking method for moving the support ring into contact with the inner layer of coil end turns.

FIGURE 7 illustrates an arrangement utilizing a pair of axially spaced concentric rings 36 and 36' applied to the inner layer of coil end turns for providing support to end turns of exceptionally long length or to end turns in which extremely large vibrations are apt to take place. As in the embodiment of FIGURE 2, the steel hoops 40 and 40' support the molding rings 36 and 36' and are mounted for movement on studs 42 preferably attached to the stator by plates 48. Since all the end turns do not lie in a perfect concentric plane, the steel hoops may pierce the molding ring and contact the insulation on the coils during the ring jacking process. To preclude direct contact between these parts, the steel hoop may be insulated with the same material as the molding ring, or other appropriate insulation 49, thus minimizing the establishment of electrical faults to ground in the event the steel hoop wears through the insulation and contacts the bare copper of the coils. Axial movement is imparted to the steel hoops with their attached molding rings 36 and 36' by threading the nuts 46 and 46' on the bolt 42 in a direction towards the stator core. Each of these are taken up uniformly around the hoops, preferably one full turn at a time, until the rings reach the desired final position, at which time, all parts of each ring are at equal distances from the stator.

FIGURE 7 is more illustrative than FIGURE 2 in showing the actual disposition of the molding rings on the steel hoops and their general configuration relative to those parts positioned between adjacent end turns. Since the rings initially may assume any one of a number of different configurations, such as being or circular, square, elliptical or other cross section, it has been found that rings of square cross section are more preferably than the other ones. As indicated previously, the end of bolt 42 is secured to a bracket 48 welded, bolted or otherwise affixed to an end of the stator core. The bolt 42, nuts 46 and 46' and the bracket 48 are retained after the jacking process is complete to permit later tightening of the bracing system after the machine is placed in service. The hoops 40 and 40' however become a part of the bracing system and help to reinforce the molding rings 36 and 36'.

Figure 6:
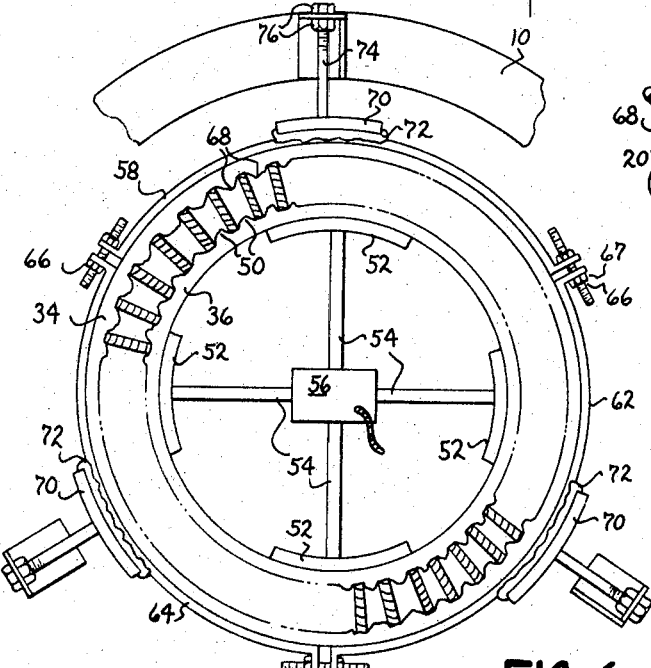
FIGURE 6 illustrates an arrangement for compressing the outer ring radially into engagement with the coil end turn surfaces, and a different method for expanding the inner ring radially into contact with the inner layer of coil end turns.

The design of FIGURE 6 illustrates how the molding ring can be expanded radially outward into contact with the inner layer of end turns. Although a multiplicity of different constructions and arrangements were made to obtain radial expansion of the ring outwardly, a preferred design which produced good results is shown in FIGURE 6. The molding ring 36 diameter is substantially the same as the inner layer of end turns and is placed in the preferred position against the end turn surfaces. To accomplish expansion of the ring radially outward into the void spaces between adjacent end turns, a jacking arrangement consisting of a multitude of spaced shoes 52 having an axial width substantially greater than the axial width of the ring, were attached to shafts 54 which terminated in pistons (not shown) housed in a hydraulic cylinder 56. The design details of the hydraulic cylinder and pistons are not shown since any well known type may be used so long as it performs the function of selectively pressing and retracting the shoes 52 in a radial direction.

It will be apparent that after one section of the ring under the shoes has been expanded outwardly, the shoes 52 are retracted and moved to a different position approximately 45° away to complete the process of expanding the remaining parts of the ring into the end turn cavities. Upon completion, the shoes and associated hydraulic equipment is removed. Obviously, the shoes could be of greater or lesser circumferential length and number, actuated by other than hydraulic means, and may assume a configuration different than that specifically shown in FIGURE 6. As in the previous modification, the conformability of the ring to the end turns is relied on to form the projections 50 located between the adjacent end turns. These projections assist the inner ring, when used, in preventing circumferential movement of the end turns when the winding is subjected to starting currents or high peak loads. After the ring is expanded into position on the end turns, the hydraulic jacking equipment is removed and a steel or other reinforcing hoop is then moved axially into contact with the inner peripheral surface of the ring. Bolts 42 and nuts 46 are then attached to the ring and the stator to impart rigidity to the system. Also, the extreme strength and relative rigidity of the ring precludes end turn movement in a direction radially inward when the machine is in operation.

This method affords more effective penetration of resinous material between adjacent end turns in the inner layer than the axial jacking process, and in most cases, therefore is the preferred method.

FIGURE 6 also illustrates an arrangement for applying the ring 34 to the outer surface of the end turns in the outer layer. As shown, the molding ring is chosen of a diameter substantially the same as the diameter of the coil end turn outer layer. Since the coil end turns project outwardly from the stator bore axis at an angle usually between 7½° and 15°, the diameter of the concentrically disposed end turns progressively increases at greater distances from the stator. For this reason, it is necessary to temporarily affix the molding ring on the stator until all the coils have been placed in the stator slots. When the coil winding process is complete, the ring then may be moved outwardly into contact with the end turn surfaces. A band 58 consisting of a multitude of sectors 60, 62 and 64 held together by a toggle arrangement 66 provides strength and support to the molding ring 34. The band also is used for compressing the ring between the end turns by uniformly tightening the jacking nuts 67 in equal increments until projections 68 of the desired size and shape are formed. In some instances, a lack of concentricity in the end turns occurs such that some project outwardly greater distances than others. For this reason, care should be exercised to assure the retention of material in ring 34 between the band 58 and the end turn surfaces.

Sometimes it is desirable to impart additional strength to the molding ring 34, particularly in those cases where the displacement and vibratory forces expected to be encountered will be exceedingly large. Such additional support may be obtained, for example, by providing a plurality of shoes 70, either with or without a supplemental support of rubber, resinous compositions or other insulating materials 72, which bears against the outer surface of the band 58. The shoe is then secured to the frame 10 through a shaft 74 and bolts 76 which when tightened to the appropriate degree, imparts additional strength to the molding ring 34. The function and action of ring 34 in holding the end turns against radial and circumferential displacement is the same as that previously described.

Figure 4:
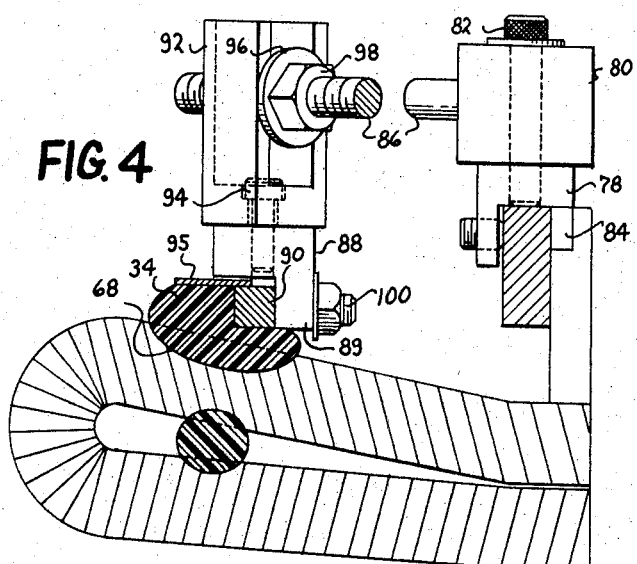
FIGURE 4 illustrates apparatus useful in jacking a support ring along the angle of the outer layer of end turns and into engagement therewith.
Figure 5:
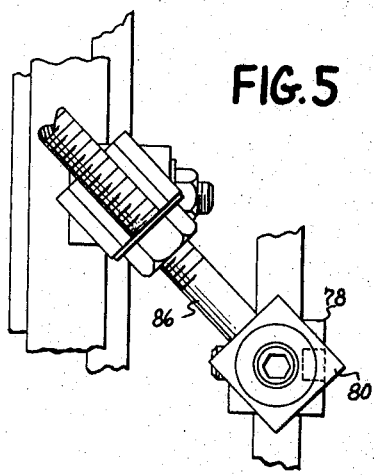
FIGURE 5 is a plan view of the apparatus shown in FIGURE 4.

The apparatus illustrated in FIGURES 4 and 5 is used for jacking a molding ring axially into position on the outer surface of the outer layer of end turns. As is well known in the art, the end turns do not fall on the same axial line as that portion of the coil in the slot but is bent at about a 45° angle while simultaneously bowing radially outward towards the stator frame and away from the motor air gap at a negative angle of about 7° to 15°. This kind of construction which is common to all form wound motors and generators gives rise to the problem of how effectively to obtain the formation of projections 68 between the adjacent end turns for limiting their circumferential and radial displacement. The design illustrated in FIGURES 4 and 5 for resolving this problem has proven to be of simple design, effective, involves less labor, and lends itself to different sizes of machines and windings having different coil angles of exit from the stator core.

As shown, a pair of square steel blocks 78 and 80 are mounted on top one another, but loosely held together by a bolt 82 for permitting relative rotative motion therebetween. The lower block 78 is equipped with a pair of spaced downwardly projecting tabs 84, shown in FIGURE 4, which fit into corresponding openings formed in an end of the finger flange support ring 26 which holds the stator laminations under compression. Since a coil projects outwardly between each finger of the flange around the stator periphery, it is apparent the lower block 78 may be placed in exact alignment with each coil where it leaves the stator slot. A bolt 86 is welded at one end to the block 80 and terminates at its other end in a similar double block support arrangement similar to 78 and 80. The lower block 88 is shaped with a projection 89 which bears against a reinforcing hoop 90 used to furnish support to the molding ring 34 after the motor is assembled. The upper block 92 is pivotally mounted on the lower block by a locking arrangement 94. As shown, a washer 96 and nut 98 is positioned in screw threaded engagement with the bar 86.

Because the molding ring 34 must be jacked outwardly away from the stator, the ring is temporarily attached to the stator until the coil winding process is complete. The ring 34 is glued or otherwise attached to the hoop 90 for restricting relative movement between the ring and hoop as they are jacked tangentially outward from the stator core.

The blocking arrangement 78 and 80 is set in position on the stator core and the bar 86 set to the exact angle as the end turns. The upper block 80 then is locked in position by means of the locking pin 82. After the hoop 90 with the attached molding ring 34 have been moved outwardly into contact with the end turns, the lower block 88 is attached to the hoop 90 by the locking arrangement 100. Since the upper block 92 swivels, it is turned to accept the bar 86 which is locked therein by nut 98. With the parts set in this position, the jacking operation can be commenced for moving the hoop and ring outwardly and tangentially on the end turns.

As the nut 98 is advanced on the bolt 86, a force is imposed on the movable upper block 92 which transmits it through the lower block to the hoop 90, thus causing the hoop 90 and its attached molding ring to move outwardly along the angle of the end turns until it reaches a final position. The hoop and ring therefore move outwardly along the exact angle of the end turns. In doing so, the inner surface of the ring will develop the projections 68 between the end turns since the ring is moved outwardly at the same elevation while the elevation of the outer layer of end turns increases. When the projections 68 reach the desired magnitude and the ring 34 is located at the desired point along the end turn length, the jacking process is stopped and the blocking arrangement removed from the stator and from the ring 90. It will be apparent that because the angles at which the bar 86 and its associated parts are located, when the nut 98 is advanced, the hoop 90 and its attached molding ring 34 will rotate to the angle of the end turns while being moved outwardly away from the stator core. The molding ring will deform as it is jacked along the end turn length but it can be contained by using a band 95 around the molding ring periphery. This arrangement of parts has proven to be of very simple design and effective in lending themselves to all different designs and ratings of motors and generators.

Even though the molding rings furnish excellent support to the individual and complete mass of end turns, it is desirable to provide supplemental bracing, particularly in motors having end turns of relatively long length. FIGURE 2 illustrates a simple, effective and inexpensive design useful for this purpose. Before the outer ring 34 is cured, a plurality of studs 102, usually about six for a 2000 HP motor, are welded or otherwise affixed at one end to ring 28 and terminates at their other ends in holes provided in back-up hoop 90. When stud nuts 104 are tightened on hoop 90, the molding ring is more firmly held in its pre-set position on the end turns.

To impart additional radial support to the outer molding ring, a steel block 106 is welded or otherwise attached at spaced intervals to the peripheral surface of hoop 90. A threaded bolt 108 is turned out of block 106 and wedged into engagement with the inner surface of frame 10, thus restricting movement of the braced end turns in a radial outward direction.

Although shrinkage does not occur in the molding rings after they are cured, it may take place in the coil insulation, depending on the insulation age and type used. Should this occur with consequent loosening of the molding rings, the latter may be tightened on the end turns merely by taking up on the stud nuts 46 and/or 104 in the appropriate direction for moving the rings into firm engagement with the end turn surfaces. Since the ring looseness may not be apparent, it easily can be detected with a strobe light or other device useful in detecting and measuring small movements in vibrating parts.

The different methods shown in each of FIGURES 2 through 7 for moving the molding rings into position on the end turns for bracing purposes, include axial jacking arrangements for moving both the outer and inner rings into contact with the end turns, and band expansion and contraction methods for forcing the rings radially into the desired position on the end turns. The different constructions which may be used for carrying out these functions are manifold and the specific designs shown in these drawings are illustrative of the different types which may be used and which have found to be effective. It will be apparent that other modifications may be readily resorted to by those skilled in the art to accomplish the objective of having the molding rings in firm contact at the desired point along the end turn length and including projections between each of the coil end turns for preventing their movement in a circumferential direction. As indicated previously, either a single or combination of rings may be used for supporting purposes. Moreover, as shown in FIGURE 7, one or more rings 32, 34 or 36 may be positioned along the end turn length.

Although many different materials may be used for the molding rings, success has been obtained by using a thermosetting resinous composition having a glass filler and identified by the trademark Glaskyd made by the Glaskyd Corporation. A similar compound not containing glass as a filler, and commercially identified by the trademark Plaskon made by the Allied Chemical Corporation also is suitable for this purpose. These products display characteristics of being initially soft and flexible but capable of curing to an extremely hard, rigid substance when subjected to the influence of heat in the temperature range of about 100–150° C. The putty-like material of these rings sometimes are enclosed in rubber, cloth, glass or other yarn coverings of substantially uniform cross section and of round, square and other configuration. They usually are used uncovered. Also, short sections may be used rather than a ring closed on itself. The particular product of the Glaskyd Corporation used in this work was Gaskyd 1901 and the Allied Chemical Corporation product was Plaskon 417, both alkyd molding compounds. The manufacturers list the following characteristics for these products:

| Property | Glaskyd 1901 | Plaskon 417 |
| --- | --- | --- |
| Flexural strength, p.s.i. | 15,000–20,000 | 8,000–11,000 |
| Tensile, p.s.i. | 6,000–8,000 | 4,000–5,000 |
| Compressive strength, p.s.i. | 24,000–26,000 | 20,000–25,000 |
| Impact (Izod) ft./lbs./in. | 2–4 | .25–.35 |
| Barcal hardness | 60–70 | 60–70 |
| Shrinkage, in./in. | .003–.006 | .008 |
| Modulus of elasticity | $2 \times 10^6$ | $2.0$–$2.7 \times 10^6$ |

Although both of these compounds are pliable and easy to work with at room temperatures, slightly better results are obtained when they are heated to a slightly higher temperature between 40° C. and 60° C. An additional important characteristic inherent in each is they tend to become quite soft just prior to the instant of becoming hard during the material curing process.

The characteristics of these products have been cited to show those factors which need to be considered in selecting rings for end turn bracing use. These two products are illustrative of those which may be used and it will be apparent to those skilled in the art that still other materials may be employed providing they display those characteristics necessary for restricting electrical conductors against displacement.

The significance of improved design described herein of restricting stator coil end turns against displacement when subjected to magnetic and/or vibratory forces and of the new methods of mounting support rings on the end turns for accomplishing restricted movement, may be more fully comprehended in light of the following results obtained from tests carried out during the development program. Although only three examples are given below, these are illustrative of the results achieved.

EXAMPLE I

A stator from a motor having a rating of 700 HP, 1200 r.p.m., 4000 volt, 3-phase, 6-pole which was in service for more than two years was returned to the factory and tests performed thereon to determine the degree of end turn displacement when subjected to normal starting currents and peak loads. The stator end turns were braced in accordance with the prior art construction wherein an insulated steel ring was placed concentrically on the outer layer of coil end turns and secured thereto by tying cords of the usual type. The test results showed that the amplitude of end turn movement was approximately the same as that appearing in other machines of the same type manufactured in the past.

All of the coils comprising the winding in this stator were removed and replaced with new coils having an organic ground insulation identified by the trademark Polyex. A bracing system of the type described in this application was then applied to the end turns which consisted of a ring between the inner and outer layers of overlapping end turns and a second ring placed around the outside periphery of the end turn outer layer. Bolts 102, FIGURE 2, were installed between the ring 28 and steel hoop 90. These rings were applied to the stator end turns by the methods described above and the ring material cured to a hard rigid substance. Tests conducted on this stator having the improved end turn support system, showed that the magnitude of end turn displacement was reduced by approximately 86% over a stator supported by the well known system of the prior art. These measurements were taken after the stator had been extensively cycled through the application of starting current to the stator winding and which was adequate to determine the effectiveness of the bracing system and to permit placing a stator braced with this design in service without concern for its performance.

Moreover, it was observed that the resonant frequency of the complete end turn system with its supporting rings fell far outside the range of the exciting current applied to the winding when the machine is in operation.

EXAMPLE II

A stator from a motor having a rating of 800 HP, 1800 r.p.m., 4160 volt, 3-phase, 4-pole was taken out of an in-service condition and which was braced in the same manner as described in the previous example and then subjected to test to determine the maximum displacement of the stator end turns. The coils comprising the winding of this stator were removed and insulated with Polyex ground insulation and rewound in the same stator magnetic core. The end turns in this stator then were provided with the bracing system of this invention and included an inner ring between the overlapping end turn layers and an outer ring disposed circumferentially on the outer layer of end turns. Tests conducted on this stator showed a reduction in the maximum amplitude of vibration by approximately 93%.

EXAMPLE III

A stator taken from a motor having a rating of 1500 HP, 3600 r.p.m., 4000 volt, 3-phase, 2-pole having a bracing system of insulated steel rings and tying cords securing the end turns to the rings, was taken out of service and was tested in the same manner described above.

As in the previous examples, the old winding and bracing system were removed and replaced in the same stator with a new winding having Polyseal insulation. The end turns of this stator then were supported along the end turn axial length by two rings spaced axially between the inner and outer overlapping end turns, by two axially spaced rings on the outer surface of the end turns, and by two axially spaced rings disposed on the inner surface of the end turns. Reinforcing steel bands were applied to the rings disposed on the inner and outer end turn surfaces. These bands were then connected to the stator by studs in the manner illustrated in FIGURE 7. The outer rings were radially supported in the manner illustrated in FIGURE 2 by axially extending studs 102 and radially disposed adjustable devices 106, 108 positioned between the bands and the stator frame. Deflection measurements taken on this stator with the newly supported end turn structure showed that the end turn displacement was reduced by 94% over the prior art construction.

In view of the above it will be apparent that many modifications and variations are possible in light of the above teachings. It therefore is to be understood that within the scope of the appended claims, the invention may be practiced other than as specifically described.

What we claim as new and desire to secure by Letters Patent of the United States is:

1. A method for installing a support ring on the inner surface of end turns extending outwardly from a stator comprising the steps of attaching a multiplicity of axially extending studs at one end to the stator, locating a support ring consisting of soft flexible material attached to the inner surface of a back-up hoop adjacent the end of the stator end turns, locating the other end of said axially extending studs in holes provided in the steel hoops, uniformly threading nuts on the studs against said steel hoops for jacking the latter into engagement with the inner end turns, continuing jacking the ring against the end turns until portions thereof protrude into the space between adjacent end turns, and curing said soft flexible material to a hard rigid substance capable of restricting end turn movement.

2. A method of placing a support ring in contact with the surface of an outer layer of end turns projecting outwardly from a winding located in a stator comprising the steps of locating a ring of soft flexible material having a steel back-up hoop disposed on its outer surface between the core and the end turn outer surface, attaching an adjustable device at one end to the back-up hoop and at its other end to the stator frame, actuating said device in a direction for moving the ring outwardly from the stator along the angle of the end turns until it reaches a predetermined position along the end turn length, continuing moving said ring forming projections on the inner surface of the ring and in the space between adjacent end turns as the ring is moved outwardly thereon, and removing said device and curing said ring to a hard rigid substance.

3. The method of claim 2 including the step of positioning re-enforcing means between the back-up hoop and the stator.

4. The method of claim 3 including the step of locating re-enforcing means between the back-up hoop and the inner surface of a frame enclosing the stator.

References Cited

UNITED STATES PATENTS 3,293,472  12/1966  Stevens _____ 310—260

JOHN F. CAMPBELL, *Primary Examiner.*

C. E. HALL, *Assistant Examiner.*

U.S. Cl. X.R.

310—260